US008825669B2

(12) United States Patent
Myaeng et al.

(10) Patent No.: US 8,825,669 B2
(45) Date of Patent: Sep. 2, 2014

(54) MOBILE APPLICATION SEARCH METHOD AND SYSTEM USING HUMAN ACTIVITY KNOWLEDGE DATABASE

(75) Inventors: Sung Hyon Myaeng, Daejeon (KR); Kyung Min Kim, Busan (KR); Yu Chul Jung, Daegu (KR); Keun Chan Park, Daejeon (KR); Jin Hyuk Choi, Seoul (KR); Chil Woo Lee, Gwangju (KR)

(73) Assignees: Korea Advanced Institute of Science and Technology, Daejeon (KR); Industry Foundation of Chonnam National University, Gwangju (KR)

( * ) Notice: Subject to any disclaimer, the term of this patent is extended or adjusted under 35 U.S.C. 154(b) by 347 days.

(21) Appl. No.: 13/338,814

(22) Filed: Dec. 28, 2011

(65) Prior Publication Data

US 2012/0179662 A1 Jul. 12, 2012

(30) Foreign Application Priority Data

Jan. 6, 2011 (KR) .................. 10-2011-0001391

(51) Int. Cl.
*G06F 17/30* (2006.01)
(52) U.S. Cl.
CPC .................. *G06F 17/3053* (2013.01)
USPC ...................................... 707/748

(58) Field of Classification Search
USPC .................................. 707/706, 748
See application file for complete search history.

(56) References Cited

U.S. PATENT DOCUMENTS

| | | |
|---|---|---|
| 2007/0067275 A1 | 3/2007 | Shekel |
| 2011/0078204 A1* | 3/2011 | Lotikar et al. ............. 707/794 |
| 2012/0101965 A1* | 4/2012 | Hennig et al. ............. 706/12 |
| 2012/0116905 A1* | 5/2012 | Futty et al. .............. 705/26.1 |

FOREIGN PATENT DOCUMENTS

KR 1020087016274 A 10/2010

* cited by examiner

*Primary Examiner* — Amresh Singh
(74) *Attorney, Agent, or Firm* — The Webb Law Firm

(57) ABSTRACT

Disclosed is a mobile application search method and system using a human activity knowledge database. The mobile application search system includes a user interface unit that provides an input environment to allow a user to input a user query and displays a mobile application search result related to the user query and a mobile application search engine that receives the user query from the user interface unit and searches for a mobile application related to the user query using an activity knowledge database in which a list of elements involved in achieving a plurality of goals that people desire in daily life is stored. The present invention increases the user's satisfaction by solving a word mismatching problem between a user query and a mobile application and improves mobile application search performance using a human activity knowledge database.

10 Claims, 2 Drawing Sheets

MOBILE APPLICATION SEARCH METHOD AND SYSTEM USING HUMAN ACTIVITY KNOWLEDGE DATABASE

CROSS-REFERENCE TO RELATED APPLICATION

This application claims priority to and the benefit of Korean Patent Application No. 2011-0001391, filed on Jan. 6, 2011, the disclosure of which is incorporated herein by reference in its entirety.

BACKGROUND

1. Field of the Invention

The present invention relates to a mobile application search method and system using a human activity knowledge database, and more particularly, to a mobile application search method and system which are capable of effectively searching for an appropriate mobile application about a user query using a human activity knowledge database.

2. Discussion of Related Art

With the popularization of smart phones and the advent of mobile application markets, a large number of mobile applications have been developed. People sometimes need a mobile application in a mobile environment according to the context. For example, a person who desires to buy a gift in the center of the city needs a web application that helps them find a nearby store that sells inexpensive goods. That is, a user having a concrete search intention inputs a query to a search engine provided by a mobile application market and then selects a mobile application to purchase from among searched mobile applications.

A keyword-based search engine used in existing mobile markets (for example, AppStore and Android Market) has been known to use a keyword-matching-based technique, which is similar to a technique used in a typical web document search engine. However, a user query usually includes a short phrase of two or three words, and thus, there frequently arises a problem in that when the words are not included in a description of an appropriate mobile application (vocabulary mismatching), the mobile application is not included in the search result.

SUMMARY OF THE INVENTION

The present invention is made to solve the above problems and directed to a mobile application search method and system which are capable of providing an efficient, high-performance mobile application search result using a human activity knowledge database.

According to an aspect of the present invention, there is provided a mobile application search system, including: a user interface unit that provides an input environment to allow a user to input a user query and displays a mobile application search result related to the user query; and a mobile application search engine that receives the user query from the user interface unit and searches for a mobile application related to the user query using an activity knowledge database in which a list of elements in which in achieving a plurality of goals that people desire in daily life is stored.

The mobile application search system may further include a query converter that converts the user query of a text form input from the user interface unit into an RDF query language (RDQL) query and transfers the RDQL query to the mobile application search engine.

The mobile application search engine may include a mobile application database in which a plurality of applications are indexed.

The mobile application database may store text information including a title, a description, and a comment of a mobile application registered in a mobile application market in a bag of words (BOW) format.

The activity knowledge database may store a list of events, places, people, objects, and miscellaneous elements which are involved in achieving a plurality of goals that people desire in daily life.

The mobile application search engine may be one in which a statistical translation-based retrieval model is extended and used.

According to another aspect of the present invention, there is provided a mobile application search method in a mobile application search system that receives a user query from a user and provides a mobile application search result related to the input user query, the method including: at the mobile application search system, receiving the user query from the user; and at the mobile application search system, searching for a mobile application related to the user query using an activity knowledge database in which a list of elements involved in achieving a plurality of goals that people desire in daily life is stored and providing the search result.

The mobile application search method may further include: at the mobile application search system, receiving the user query of a text form from the user; at the mobile application search system, converting the user query of the text form into an RDF query language (RDQL) query; at the mobile application search system, calculating semantic relevance between two concepts using the activity knowledge database so as to calculate a search score between text data of the mobile application and the RDQL query; at the mobile application search system, calculating a translation probability between the concepts based on the semantic relevance between the concepts; at the mobile application search system, calculating a semantic-based search score between words included in text data of the mobile application on a knowledge-based search model generated using the translation probability between the concepts; at the mobile application search system, calculating a semantic-based search score of the mobile application using the semantic-based search score between the words; at the mobile application search system, calculating a final search score of the mobile application by combining the calculated semantic-based search score of the mobile application with a keyword-based search score; and at the mobile application search system, outputting a high rank search result which is a search result of the mobile application corresponding to a high rank according to a predetermined criterion among the search scores of the mobile application.

The calculating of the semantic relevance between the concepts may include calculating semantic relevance using a linear combination of reliability and a degree of information of a pair of two concepts.

The calculating of the semantic-based search score between the words included in the user query of the text form may include calculating a search score by a query model generated by a maximum likelihood estimation technique and a knowledge-based search model generated using a translation probability between the concepts.

The calculating of the final search score of the mobile application may include calculating the search score of the mobile application using the semantic-based search score of the words, a language model, and a weight given to the activity knowledge database.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
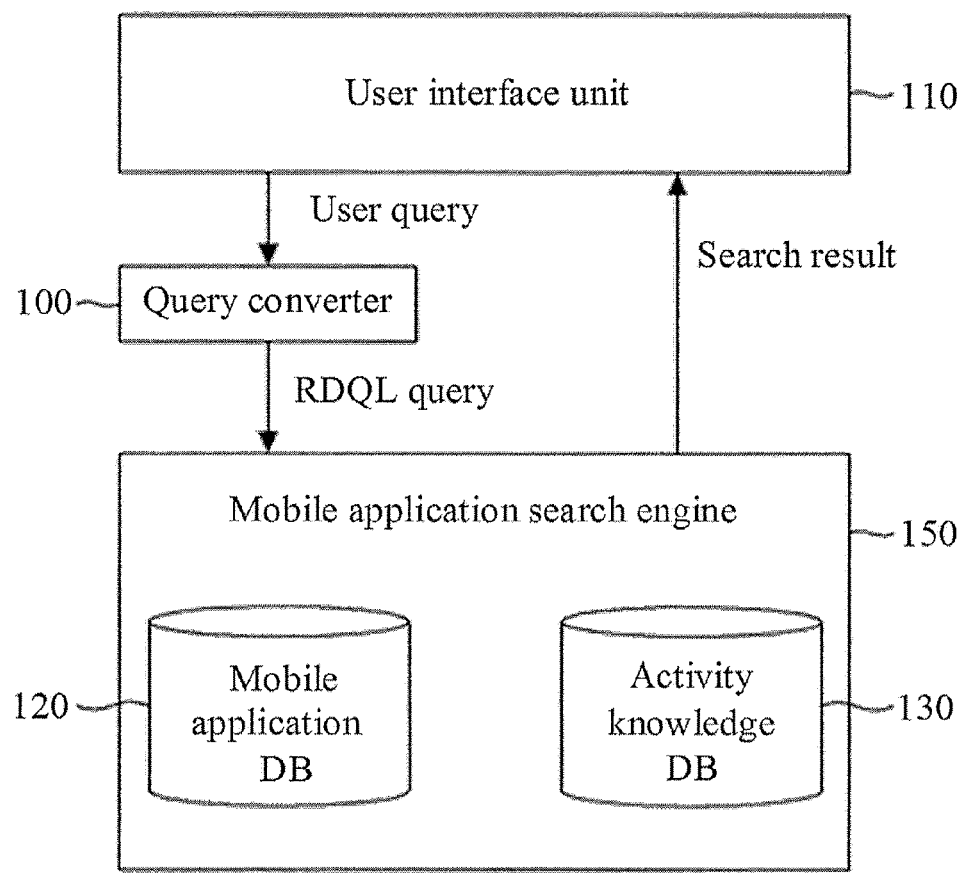
FIG. 1 is a block diagram illustrating a configuration of a mobile application search system using an activity knowledge database according to an embodiment of the present invention.

Exemplary embodiments of the present invention will be described in detail below with reference to the accompanying drawings. In the drawings, like parts are denoted by like reference numerals. In the description of the present invention, if it is judged that a concrete description of a known relevant function or configuration makes the gist of the present invention ambiguous, and a detailed description thereof will be omitted.

FIG. 1 is a block diagram illustrating a configuration of a mobile application search system using a human activity knowledge database (DB) according to an embodiment of the present invention.

As illustrated in FIG. 1, a mobile application search system using a human activity knowledge DB according to an embodiment of the present invention includes a user interface unit 110, a query converter 100, and a mobile application search engine 150.

The user interface 110 provides an input environment that allows a user to input a user query and displays a mobile application search result relevant to the user query.

The mobile application search engine 150 receives the user query from the user interface unit 110 and searches for a mobile application relevant to the user query using a human activity knowledge DB 130 that stores a list of elements involved in achieving a plurality of goals which people desire in daily life.

The mobile application search engine 150 includes a mobile application DB 120 in which a plurality of mobile applications are indexed.

The query converter 100 converts the user query of the text form input from the user interface unit 110 into a resource description framework (RDF) query language (RDQL) query and transfers the RDQL to the mobile application search engine 150.

In an embodiment of the present invention, the mobile application DB 120 may store text information including a title, a description, and a comment of a mobile application registered in a mobile application market in a bag of words (BOW) format. In the mobile application DB 120, text data of a mobile application is indexed as a search target and stored in a format which is easy to search.

In an embodiment of the present invention, the human activity knowledge DB 130 may store a list of events, places, people, objects, and miscellaneous elements which are involved in achieving a plurality of goals which people desire in daily life.

In an embodiment of the present invention, the mobile application search engine 150 may be implemented by extending a statistical translation-based retrieval model.

The human activity knowledge DB 130 refers to a knowledge DB generated in a manual or automatic manner and may include a list of at least one of six types of elements, such as an event, a place, a person, a time, an object, and a miscellaneous element, involved in achieving a plurality of goals that people desire to resolve in daily life. The user query usually includes a word related to the situation or desired activity, and the description of the mobile application usually includes a description of the situation or human activity which can be assisted by the mobile application as well as a function provided by the mobile application. Thus, by using the human activity knowledge DB 130, a word mismatching problem between the user query and the mobile application can be solved, and the mobile application search performance can be improved.

The mobile application search engine 150 may be generated by extending an existing statistical translation-based retrieval model using semantic relevance information between two concepts calculated by the human activity knowledge DB 130.

The query converter 100 converts the user query of the text form into the RDQL query and provides the RDQL query to the mobile application search engine 150.

The user interface unit 110 may be similar to an interface currently provided from the mobile application market for a search. The user interface unit 110 receives the user query, transfers the user query to the mobile application search engine 150, and displays the mobile application search result.

An operation process of the mobile application search system using the human activity knowledge DB will be described below in detail with reference to FIG. 2.

Figure 2:
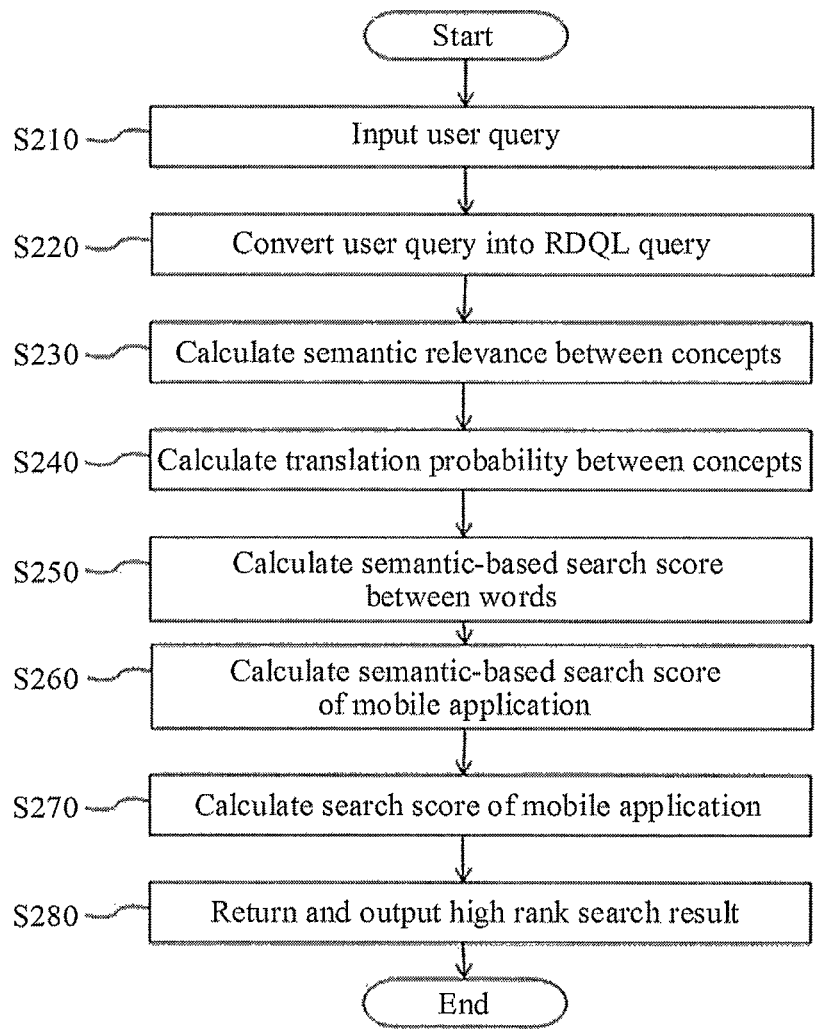
FIG. 2 is a flowchart illustrating a mobile application search method using an activity knowledge database according to an embodiment of the present invention.

FIG. 2 is a flowchart illustrating a mobile application search method using a human activity knowledge DB according to an embodiment of the present invention.

Referring to FIG. 2, in step S210, the user inputs the user query of the text form to the user interface unit 110.

In step S220, the concept-based user query converter 100 converts the user query of the text form into the RDQL query. In the present embodiment, the query is generated such that each word included in the user query is searched from the human activity knowledge DB 130, and then a concept is allocated to at least one of classes of six searched types (an event, a place, a person, a time, an object, and a miscellaneous element). Here, the concept-based user query converter 100 of the present invention is not limited to the aforementioned technique, and all techniques capable of converting the user query of the text form into the concept-based RDQL query can be applied. For example, in the case of a word that can have two meanings of a place and a person, the word may be analyzed as having a higher chance of having one meaning through a mechanical learning technique. For example, a user query "check health" is converted into the following RDQL query:

SELECT ? Goal:*
WHERE (? Goal:hasEvent"check health")
(? Goal:hasEvent "check")
(? Goal:hasThing"health")

In step S230, semantic relevance between concepts, which is an important factor in calculating a search score between the RDQL query and text data of the mobile application, is calculated according to the following two principles.

First, a concept extracted from the human activity knowledge DB with high extraction reliability has high reliability.

Second, a pair of concepts having a higher degree of information has high relevance. For example, a pair of "check health (event)" and "cholesterol (object)" is higher in relevance than a pair of "check health (event)" and "building (object)". This is because "cholesterol" plays a more important role than "building" when people conduct activity such as "to live healthy (goal)" or "to live for a long time (goal)".

Reliability of a certain concept is based on an anticipation accuracy acc(c,w) when extracted from the human activity knowledge DB by an automated technique such as a mechanical learning technique, where "c" is a concept, and "w" is an extraction target document. Reliability of the concept c extracted from n extraction target documents is calculated by the following Equation 1:

$$conf(c) = \frac{1}{n}\sum_{i=1}^{n} acc(c, w_i). \quad \text{Equation 1}$$

A degree of information between two concepts (cx,cy) is based on a point-wise mutual information scale that is measured based on a goal on the human activity knowledge DB 130.

The degree of information is calculated by the following Equation 2:

$$inf(c_x, c_y) = \log\frac{p(c_x, c_y)}{p(c_x)\cdot p(c_y)} = \log\sum_{g_i EG}\frac{cnt(c_x^{gi}, c_y^{gi})}{cnt(c_x^{gi})\cdot cnt(c_y^{gi})} \quad \text{Equation 2}$$

where G is a set of goals, $cnt(e_x^{gi}, c_y^{gi})$ is the number of goals including the two concepts, and $cnt(c_x^{gi})$ is the number of goals including cx.

The semantic relevance between the two concepts is decided based on a linear combination of the reliability and the degree of information as in the following Equation 3:

$$\text{SemRel}(c_x, c_y) = \beta\cdot\{conf(c_x) + conf(c_y)\} + (1-\beta)\cdot inf(c_x, c_x) \quad \text{Equation 3}$$

where $0 \leq \beta \leq 1$.

In step S240, a translation probability between concepts is calculated. This is necessary so as to calculate a search score between the concept of the RDQL query and the concept shown in text data of the mobile application and calculated based on the semantic relevance of a pair of two concepts calculated in step S230.

Next, a translation probability of a pair of concepts $(ci^k, cj^l)$ is calculated by Equation 4:

$$P(c_i^k \mid c_j^l) = \frac{SemRel(c_i^k, c_j^l)}{\sum_{c_i^k EC^k} SemRel(c_i^k, c_j^l)} \quad \text{Equation 4}$$

where k and l are variables, each of which designates a class of six types (an event, a place, a person, a time, an object, and a miscellaneous element) that configure the human activity knowledge DB 130, S is a set of variables representing classes of six types, and $C^k$ is a set of all concepts belonging to a class k.

In step S250, a semantic-based search score of a word ti shown in text data of the mobile application on a knowledge-based search model $\theta_Q^K$ (generated using a given query Q, a query model generated $\theta_Q^0$ by a maximum likelihood estimation technique, and a translation probability between concepts calculated in step S240 is calculated by Equation 5. This is a technique in which a known statistical translation-based retrieval model is extended.

$$P(t_i \mid \theta_Q^K) = \sum_{t_j EQ} P(t_i \mid t_j)P(t_j \mid \theta_Q^0) \quad \text{Equation 5}$$

$$= \sum_{c_k EC^{ti}}\sum_{c_i EC^{tj}}\sum_{t_j EQ} P(c_k \mid c_j)P(t_j \mid \theta_Q^0)$$

In step S260, a semantic-based search score of the mobile application is calculated using a score calculation function of Equation 6:

$$Score_{KB}(Q, D) = \sum_{t_j EV}\sum_{t_j EQ} P(t_i \mid t_j)P(t_j \mid \theta_Q^0)\log P(t_i \mid \theta_D) \quad \text{Equation 6}$$

$$= \sum_{t_j EV}\sum_{kES}\sum_{lES}\sum_{t_j EQ} w_{kl}\cdot P(c_i^k \mid c_j^l)$$

$$P(t_j \mid \theta_Q^0)\log P(t_i \mid \theta_D)$$

where $\theta_D$ is a language model generated on text data D of a certain mobile application, and $w_{kl}$ is a weight on activity knowledge DB classes k and l of two persons.

In an embodiment of the present invention, $w_{kl}=w_k\cdot w_l$, and in the case of $k\in\{event, object\}$, $w_k$ is set to 1, and in the other cases, $w_k$ is set to 0.5. The weight is a parameter influencing performance of the present system and is not limited to an embodiment of the present invention. For example, the weight can be set to various values for improving the performance of the system of the present invention.

When the human activity knowledge DB 130 is insufficient, if only the semantic-based search score is used, the mobile application may not have a high search rank. Thus, in step S270, a final search score is calculated by combining the semantic-based search score $Score_{KB}$ calculated in step S260 with a keyword-based search score $Score_K$ typically used in a web search field through Equation 7. In the present embodiment, the keyword-based search score $Score_K$ was calculated using Lucene package, and a linear combination parameter t of the two scores was set to 0.5. Finally, in step S280, a high rank search result is returned and output.

$$t\cdot Score_K(Q,D) + (t-1)\cdot Score_{KB}(Q,D) \quad \text{Equation 7.}$$

According to the present invention, there is an effect of increasing the user's satisfaction by solving a word mismatching problem between a user query and a mobile application and improving mobile application search performance using a human activity knowledge database.

The exemplary embodiment of the present invention has been described above, but the present invention is not limited to the above exemplary embodiment. It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A mobile application search system, comprising:
    a user interface unit that provides an input environment to allow a user to input a user query and displays a mobile application search result related to the user query; and
    a mobile application search engine that receives the user query from the user interface unit and searches for a mobile application related to the user query using an activity knowledge database in which a list of elements involved in achieving a plurality of goals that people desire in daily life is stored, wherein the mobile application search engine is configured to: receive the user query of a text form; convert the user query of the text form into a query language query; calculate semantic relevance between two concepts using the activity knowledge database so as to calculate a search score between text data of the mobile application and the query language query; calculate a translation probability between the conceits based on the semantic relevance between the concepts; calculate a semantic-based search score between words included in text data of the mobile application on a knowledge-based search model generated using the translation probability between the concepts; calculate a semantic-based search score of the mobile application using the semantic-based search score between the words; calculate a final search score of the mobile application by combining the calculated semantic-based search score of the mobile application with a keyword-based search score; and output a high rank search result which is a search result of the mobile application corresponding to a high rank according to a predetermined criterion among the search scores of the mobile application.

2. The mobile application search system of claim 1, further comprising a query converter that converts the user query of a text form input from the user interface unit into an RDF query language (RDQL) query and transfers the RDQL query to the mobile application search engine.

3. The mobile application search system of claim 1, wherein the mobile application search engine includes a mobile application database in which a plurality of applications are indexed.

4. The mobile application search system of claim 3, wherein the mobile application database stores text information including a title, a description, and a comment of a mobile application registered in a mobile application market in a bag of words (BOW) format.

5. The mobile application search system of claim 1, wherein the activity knowledge database stores a list of events, places, people, objects, and miscellaneous elements which are involved in achieving a plurality of goals that people desire in daily life.

6. The mobile application search system of claim 1, wherein the mobile application search engine is one in which a statistical translation-based retrieval model is extended and used.

7. A mobile application search method in a mobile application search system that receives a user query from a user and provides a mobile application search result related to the input user query, the method comprising:
 at the mobile application search system, receiving the user query from the user; and
 at the mobile application search system, searching for a mobile application related to the user query using an activity knowledge database in which a list of elements involved in achieving a plurality of goals that people desire in daily life is stored and providing the search result;
 at the mobile application search system, receiving the user query of a text form from the user;
 at the mobile application search system, converting the user query of the text form into a query language query;
 at the mobile application search system, calculating semantic relevance between two concepts using the activity knowledge database so as to calculate a search score between text data of the mobile application and the query language query;
 at the mobile application search system, calculating a translation probability between the concepts based on the semantic relevance between the concepts;
 at the mobile application search system, calculating a semantic-based search score between words included in text data of the mobile application on a knowledge-based search model generated using the translation probability between the concepts;
 at the mobile application search system, calculating a semantic-based search score of the mobile application using the semantic-based search score between the words;
 at the mobile application search system, calculating a final search score of the mobile application by combining the calculated semantic-based search score of the mobile application with a keyword-based search score; and
 at the mobile application search system, outputting a high rank search result which is a search result of the mobile application corresponding to a high rank according to a predetermined criterion among the search scores of the mobile application.

8. The mobile application search method of claim 7, wherein the calculating of the semantic relevance between the concepts includes calculating semantic relevance using a linear combination of reliability and a degree of information of a pair of two concepts.

9. The mobile application search method of claim 7, wherein the calculating of the semantic-based search score between the words included in the user query of the text form includes calculating a search score by a query model generated by a maximum likelihood estimation technique and a knowledge-based search model generated using the translation probability between the concepts.

10. The mobile application search method of claim 7, wherein the calculating of the final search score of the mobile application includes calculating the search score of the mobile application using the semantic-based search score between the words, a language model, and a weight given to the activity knowledge database.

* * * * *

UNITED STATES PATENT AND TRADEMARK OFFICE
CERTIFICATE OF CORRECTION

PATENT NO.       : 8,825,669 B2                    Page 1 of 1
APPLICATION NO.  : 13/338814
DATED            : September 2, 2014
INVENTOR(S)      : Sung Hyon Myaeng et al.

It is certified that error appears in the above-identified patent and that said Letters Patent is hereby corrected as shown below:

In the Claims

Column 7, Line 9, Claim 1, delete "conceits" and insert -- concepts --

Column 7, Line 52, Claim 7, delete "user; and" and insert -- user; --

Signed and Sealed this
Thirtieth Day of December, 2014

Michelle K. Lee
*Deputy Director of the United States Patent and Trademark Office*